US 6,732,502 B2

(12) United States Patent
Seda et al.

(10) Patent No.: US 6,732,502 B2
(45) Date of Patent: May 11, 2004

(54) COUNTER ROTATING AIRCRAFT GAS TURBINE ENGINE WITH HIGH OVERALL PRESSURE RATIO COMPRESSOR

(75) Inventors: Jorge F. Seda, Cincinnati, OH (US); Lawrence W. Dunbar, Cincinnati, OH (US); Peter N. Szucs, West Chester, OH (US); John C. Brauer, Lawrenceburg, IN (US); James E. Johnson, Hamilton, OH (US)

(73) Assignee: General Electric Company, Schenectady, NY (US)

( * ) Notice: Subject to any disclaimer, the term of this patent is extended or adjusted under 35 U.S.C. 154(b) by 121 days.

(21) Appl. No.: 10/087,428

(22) Filed: Mar. 1, 2002

(65) Prior Publication Data

US 2003/0163983 A1 Sep. 4, 2003

(51) Int. Cl.[7] .................................................. F02K 3/04
(52) U.S. Cl. ........................................ 60/226.1; 60/268
(58) Field of Search ..................... 60/39.161, 39.162, 60/226.1, 268

(56) References Cited

U.S. PATENT DOCUMENTS

| 4,558,564 | A | 12/1985 | Bouiller et al. |
|---|---|---|---|
| 4,758,129 | A | 7/1988 | Strock |
| 4,790,133 | A | 12/1988 | Stuart |
| 4,809,498 | A | 3/1989 | Giffin, III et al. |
| 4,860,537 | A | 8/1989 | Taylor |
| 4,951,461 | A | 8/1990 | Butler |
| 4,965,994 | A | 10/1990 | Ciokajlo |
| 4,976,102 | A | 12/1990 | Taylor |
| 5,160,251 | A | 11/1992 | Ciokajlo |
| 5,177,957 | A | 1/1993 | Grieb |
| 5,261,227 | A | 11/1993 | Giffin, III |
| 5,307,622 | A | 5/1994 | Ciokajlo et al. |
| 5,361,580 | A | 11/1994 | Ciokajlo |
| 5,409,184 | A | 4/1995 | Udall et al. |
| 5,443,590 | A | 8/1995 | Ciokajlo |
| 5,452,575 | A | 9/1995 | Freid |
| 5,813,214 | A | 9/1998 | Moniz et al. |
| 6,088,632 | A | 7/2000 | Zaccaria et al. |
| 6,487,848 | B2 | 12/2002 | Zysman et al. |
| 6,543,405 | B2 | 4/2003 | Sachdev et al. |

OTHER PUBLICATIONS

"Proven Technology Drives Continuing Success of GE's CF34 Engine Family", Press Release, GE Aircraft Engines, http://www.geae.com, Aug. 8, 2003, 2 pages.
"BR700", Civil aerospace, Rolls–Royce, http://www.rolls–royce.com, Aug. 8, 2003, 2 pages.
"Emirates orders GP7000 to power Airbus A380s", Feb. 28, 2002, http://www.pratt–whitney.com, Aug. 8, 2003, 3 pages.

Primary Examiner—Louis J. Casaregola
(74) Attorney, Agent, or Firm—Nathan D. Herkamp; Steven J. Rosen (57) ABSTRACT

An aircraft gas turbine engine includes high and low pressure turbines having respective counter rotatable low pressure inner and outer rotors with low pressure inner and outer shafts in part rotatably disposed co-axially within a high pressure rotor and drivingly connected to first and second fan blade rows and first and second boosters respectively. A bypass duct radially bounded by a fan casing and an annular radially inner bypass duct wall surrounds the boosters axially located between the first and second fan blade rows. The engine has a high pressure compressor operable to produce an overall pressure ratio in a range of about 40–65 and a fan inlet hub to tip radius ratio in a range between 0.20 and 0.35, a bypass ratio in a range of 5–15, an operational fan pressure ratio in a range of 1.4–2.5, and a sum of operational fan tip speeds in a range of 1000 to 2500 feet per second.

19 Claims, 8 Drawing Sheets

COUNTER ROTATING AIRCRAFT GAS TURBINE ENGINE WITH HIGH OVERALL PRESSURE RATIO COMPRESSOR

BACKGROUND OF THE INVENTION

1. Field of the Invention

The invention relates to counter rotating aircraft gas turbine engines with counter rotating fans driven by counter rotating low pressure turbine rotors and, particularly, for such engines having high bypass and overall compressor ratios and low hub to tip ratios.

2. Description of Related Art

A gas turbine engine of the turbofan type generally includes a forward fan and booster compressor, a middle core engine, and an aft low pressure power turbine. The core engine includes a high pressure compressor, a combustor and a high pressure turbine in a serial flow relationship. The high pressure compressor and high pressure turbine of the core engine are interconnected by a high pressure shaft. The high pressure compressor, turbine, and shaft essentially form the high pressure rotor. The high pressure compressor is rotatably driven to compress air entering the core engine to a relatively high pressure. This high pressure air is then mixed with fuel in the combustor and ignited to form a high energy gas stream. The gas stream flows aft and passes through the high pressure turbine, rotatably driving it and the high pressure shaft which, in turn, rotatably drives the compressor.

The gas stream leaving the high pressure turbine is expanded through a second or low pressure turbine. The low pressure turbine rotatably drives the fan and booster compressor via a low pressure shaft, all of which form the low pressure rotor. The low pressure shaft extends through the high pressure rotor. Some low pressure turbines have been designed with counter rotating turbines that power counter rotating fans and booster or low pressure compressors. U.S. Pat. Nos. 4,860,537, 5,307,622 and 4,790,133 disclose counter rotating turbines that power counter rotating fans and booster or low pressure compressors. Most of the thrust produced is generated by the fan.

Large modern commercial turbofan engines have higher operating efficiencies with higher bypass ratio configurations and larger transition ducts between low pressure and high pressure turbines. The frames, especially those located in the engine hot section, are complex and expensive. These engines feature high by pass ratio configurations that yield high propulsive efficiency and with large diameter fans rotating at low tip speeds that enable low noise and high fan efficiency with a corresponding fuel consumption reduction. The low speed of the fan rotor, which is beneficial to the fan, can have an adverse impact on the low pressure turbine configuration that benefits from higher rotational speeds that reduce aerodynamic loading and improve efficiency. These conflicting objectives requirements necessitate compromises in low pressure turbine and fan efficiencies, stage counts, and transition duct lengths between the core engine and low pressure turbine. These compromises lead to heavy and costly engine configurations. It is highly desirable to produce aircraft gas turbine engines with significantly lower levels of noise, weight, specific fuel consumption, and cost.

SUMMARY OF THE INVENTION

An aircraft gas turbine engine has a high pressure rotor including a high pressure turbine and a low pressure turbine having counter rotating low pressure inner and outer rotors located aft of the high pressure rotor. The low pressure inner and outer rotors include low pressure inner and outer shafts which are at least in part rotatably disposed co-axially with and radially inwardly of the high pressure rotor. A rotatable annular outer drum rotor is drivingly connected to a first fan blade row and a first booster by the low pressure inner shaft. A rotatable annular inner drum rotor is drivingly connected to a second fan blade row and a second booster by the low pressure outer shaft. The first and second boosters are axially located between the first and second fan blade rows.

A bypass duct is radially bounded by a fan casing and an annular radially inner bypass duct wall which surrounds the first and second boosters. A radially outer portion of the second fan blade row is radially disposed within the bypass duct. The engine has a fan inlet hub to tip radius ratio in a range between 0.20 and 0.35, a bypass ratio in a range of 5–15, an operational fan pressure ratio in a range of 1.4–2.5, and a sum of operational fan tip speeds of the first and second fan blade rows in a range of 1000 to 2500 feet per second. A high pressure compressor of the high pressure rotor is drivenly connected to the high pressure turbine by a high pressure shaft and the high pressure compressor is designed and operable to produce a compressor pressure ratio in a range of about 15–30 and overall pressure ratio in a range of about 40–65. The engine is designed such that the last stage of the booster and, in the exemplary embodiment, the second fan blade row are counter rotatable with respect to the high pressure compressor.

In the exemplary embodiment of the invention, the high pressure compressor includes between six and eight high pressure stages and about four variable vane stages. Less than four variable vane stages may be used. The first booster includes an integrally bladed annular first booster rotor section including a rotatable wall section from which axially spaced apart first booster blade rows extend radially inwardly. An outlet guide vane assembly is located directly aft of the low pressure turbine.

The invention also includes an aircraft gas turbine engine family having at least two different engine models or variations of the engine with substantially the same fan diameter. A first one of the engine models has a one stage high pressure turbine and a second one of the engine models has a two stage high pressure turbine.

Further embodiments of the invention include a second seal in sealing arrangement between forward ends of the low pressure turbine casing and the outer drum rotor, a third seal in sealing arrangement between the low pressure turbine casing and a final stage of the low pressure turbine blade rows which is bolted to an aft end of the outer drum rotor, and a first seal in sealing arrangement between the second fan and the fan frame. The seals are brush seals, however in other embodiments the seals may be non contacting seals or a combination of brush seals and non-contacting seals. The non-contacting seals may be aspirating seals or face seals.

BRIEF DESCRIPTION OF THE DRAWINGS

The foregoing aspects and other features of the invention are explained in the following description, taken in connection with the accompanying drawings where.

DETAILED DESCRIPTION OF THE INVENTION

Figure 1:
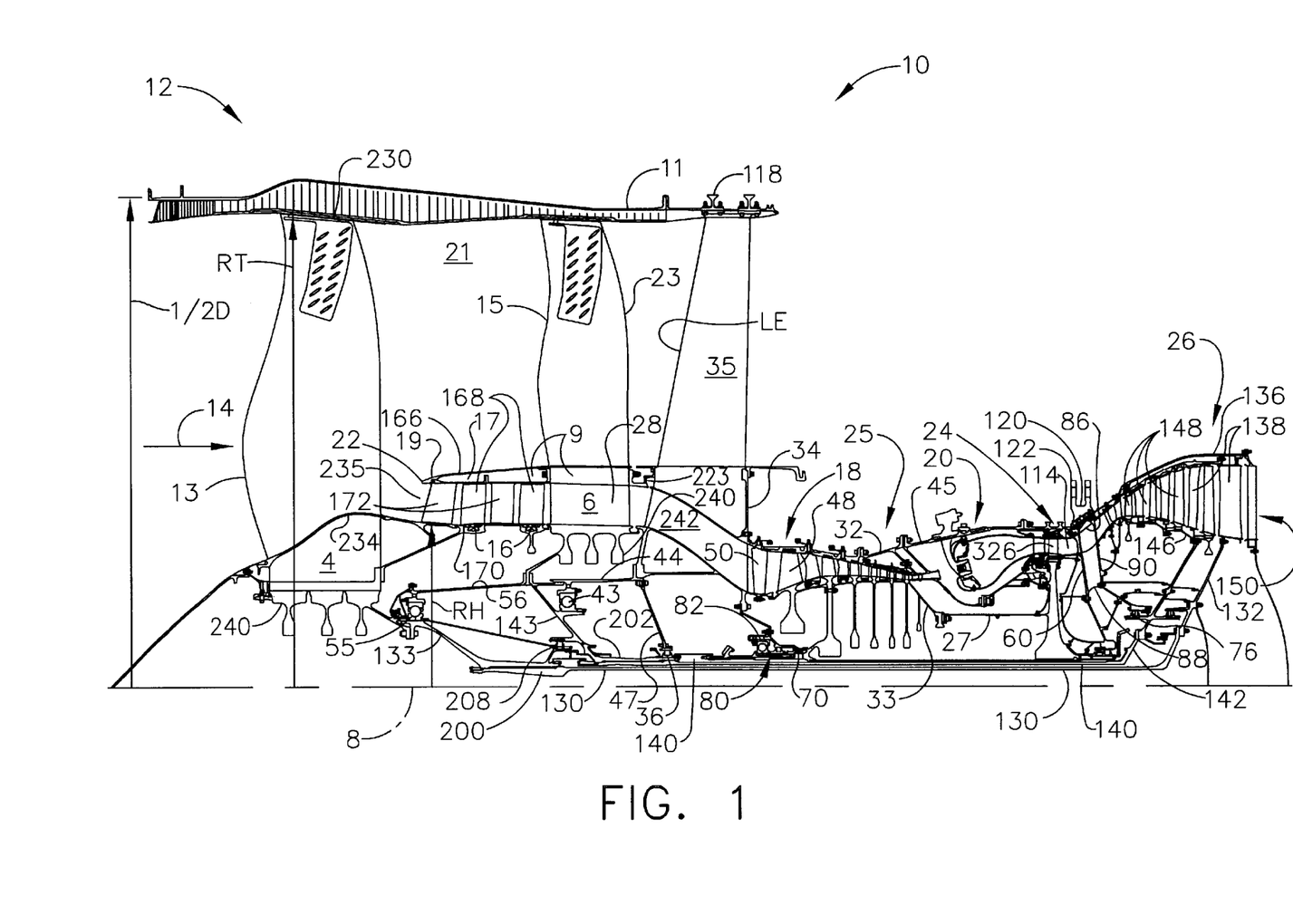
FIG. 1 is a longitudinal sectional view illustration of exemplary embodiment of an aircraft turbofan gas turbine engine with a counter rotating low pressure turbine supported by an inter-turbine frame axially located between the low pressure turbine and a high pressure turbine.

Illustrated schematically in FIG. 1 is a first exemplary turbofan gas turbine engine 10 circumscribed about an engine centerline 8 and having a fan section 12 which receives inlet airflow of ambient air 14. The fan section 12 has counter rotating first and second fans 4 and 6 including first and second fan blade rows 13 and 15 and counter rotating first and second boosters 16 and 17, respectively. The counter rotating first and second boosters 16 and 17 are axially located between the counter rotating first and second fan blade rows 13 and 15, an arrangement which provides reduced noise emanating from the fan section 12. Following the fan section 12 is a high pressure compressor (HPC) 18, a combustor 20 which mixes fuel with the air 14 pressurized by the HPC 18 for generating combustion gases which flow downstream through a high pressure turbine (HPT) 24, and a counter rotating low pressure turbine (LPT) 26 from which the combustion gases are discharged from the engine 10. The engine 10 is designed such that the last stage of the second booster 17 and, in the exemplary embodiment, the second fan blade row 15 are counter rotatable with respect to the high pressure compressor 18. This reduces the sensitivity of the engine 10 to airflow inlet distortion of the fan section 12. It also reduces mutual sensitivity to rotating stall cells in the other rotors.

A high pressure shaft 27 joins the HPT 24 to the HPC 18 to substantially form a first or high pressure rotor 33. The high pressure compressor 18, combustor 20, and high pressure turbine 24 collectively are referred to as a core engine 25 which includes, for the purposes of this patent, the high pressure shaft 27. The core engine 25 is modular such that as a single unit it can be independently replaced separate from the other parts of the gas turbine.

A bypass duct 21 radially, bounded by a fan casing 11 and a rotatable annular radially inner bypass duct wall 9, surrounds the counter rotating first and second boosters 16 and 17 and an inlet duct 19 to the high pressure compressor 18 of the core engine 25. The bypass duct 21 is radially bounded by a fan casing 11 and an annular radially inner bypass duct wall 9. The radially inner bypass duct wall 9 includes a rotatable wall section 22 fixedly mounted to the second fan blade row 15 and from which the second booster 17 depends radially inwardly. A radially outer portion 23 of the second fan blade row is radially disposed within the bypass duct 21.

Figure 3:
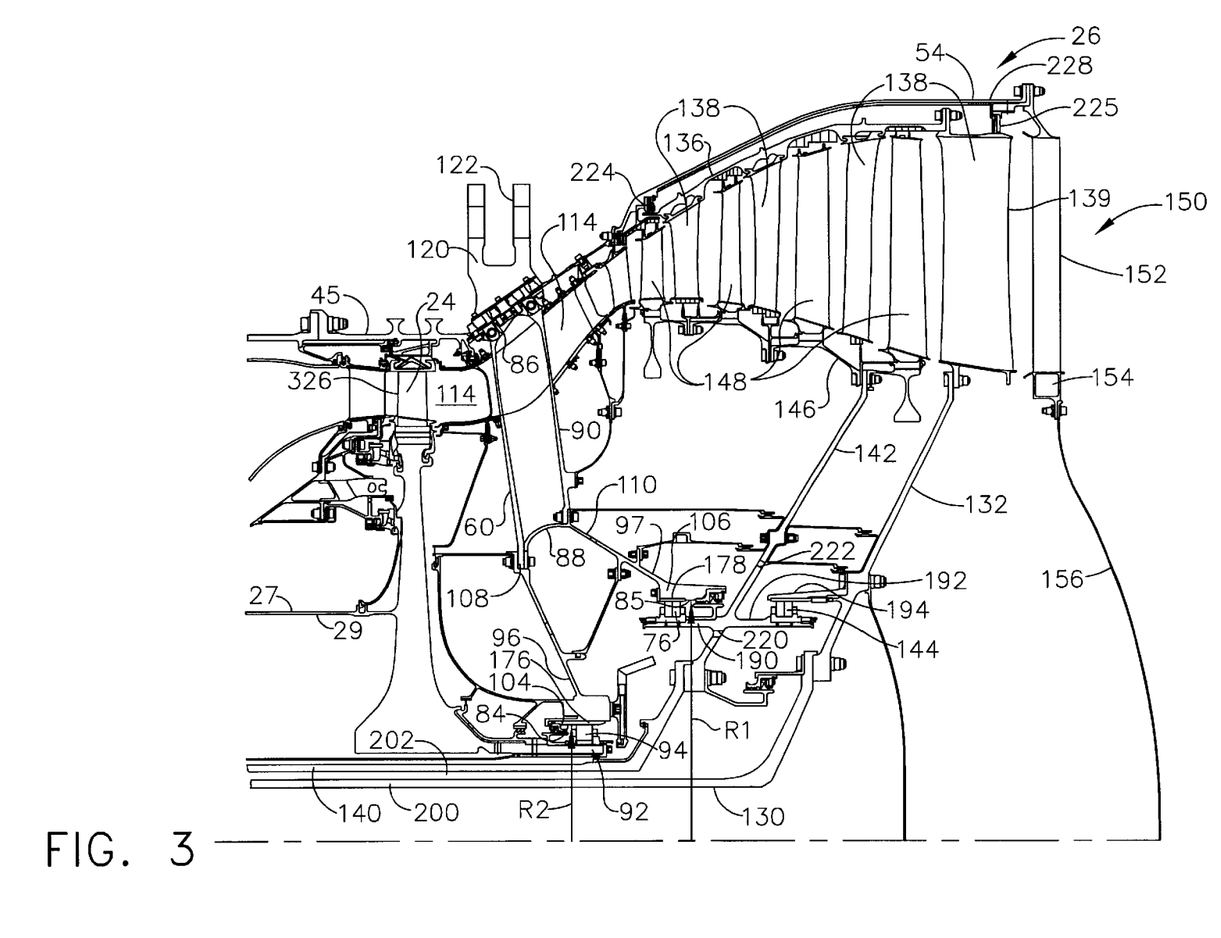
FIG. 3 is an enlarged view illustration of the inter-turbine frame and counter rotating low pressure turbine rotors of the engine in FIG. 1.

Referring now to FIGS. 1 and 3, the counter rotating low pressure turbine 26 includes an annular outer drum rotor 136 rotatably mounted to a low pressure inner shaft 130 by an aft low pressure inner conical shaft extension 132. The outer drum rotor 136 includes a plurality of low pressure turbine blade rows 138 extending radially inwardly therefrom and axially spaced from each other. The drum rotor 136 is cantilevered off of a final stage 139 of the low pressure turbine blade rows 138 which is bolted to the aft low pressure inner conical shaft extension 132. The counter rotating low pressure turbine 26 also includes an annular low pressure inner drum rotor 146 rotatably mounted to a low pressure outer shaft 140 by an aft low pressure outer conical shaft extension 142. The inner drum rotor 146 includes a plurality of second low pressure turbine blade rows 148 extending radially outwardly therefrom and axially spaced from each other. The first low pressure turbine blade rows 138 are interdigitated with the second low pressure turbine blade rows 148.

The low pressure outer shaft 140 drivingly connects the inner drum rotor 146 to the second fan blade row 15 and the second booster 17. The second fan blade row 15 is connected to the low pressure outer shaft 140 by a forward conical outer shaft extension 143. The low pressure outer shaft 140, the inner drum rotor 146, the second fan blade row 15, and the second booster 17 are major components of a low pressure outer rotor 202. The low pressure inner shaft 130 drivingly connects the outer drum rotor 136 to the first fan blade row 13 and the first booster 16. The first fan blade row 13 is connected to the low pressure inner shaft 130 by a forward conical inner shaft extension 133. The low pressure inner shaft 130, the outer drum rotor 136, the first fan blade row 13, and the first booster 16 are major components of a low pressure inner rotor 200.

The first booster 16 includes an annular first booster rotor section 166 including the rotatable wall section 22 from which axially spaced apart first booster blade rows 168 extend radially inwardly. The annular first booster rotor section 166 is illustrated as being integrally bladed in a manner similar to an integrally bladed disk, commonly referred to as a Blisk, or an integrally bladed rotor which has been used in conventional rotors because they are lightweight and allow no blade attachment leakage. The operating low speeds of the boosters and the low weight integrally bladed disk design of the first booster rotor section 166 helps minimize stresses and deflections of the first booster rotor section 166.

The second booster 17 includes an annular second booster rotor section 170 from which axially spaced apart second booster blade rows 172 extend radially outwardly. A radially inner portion 28 of the second fan blade row 15 is radially disposed within the inlet duct 19 and rotates with the second booster 17 and therefore is considered part of the second booster 17 and a second booster blade row 172. The first and second booster blade rows 168 and 172 are interdigitated and are counter rotating. The first and second fan blade rows 13 and 15 are fixedly attached to the first and second booster rotor sections 166 and 170, respectively. The low pressure inner and outer shafts 130 and 140, respectively, are at least, in part, rotatably disposed co-axially with and radially inwardly of the high pressure rotor 33.

The engine 10 has frame structure 32 including a forward or fan frame 34 connected by an engine casing 45 to a mid-engine or inter-turbine frame 60. The second fan blade row is axially located close to struts 35 of the fan frame 34 and so the leading edges of struts 35 are swept or leaned axially aftwardly to reduce noise. The engine 10 is mounted within or to an aircraft such as by a pylon (not illustrated) which extends downwardly from an aircraft wing. The inter-turbine frame 60 includes a first structural ring 86, which may be a casing, disposed co-axially about the centerline 8. The inter-turbine frame 60 further includes a second structural ring 88 disposed co-axially with and radially spaced inwardly of the first structural ring 86 about the centerline 8. The second structural ring 88 may also be referred to as a hub. A plurality of circumferentially spaced apart struts 90 extend radially between the first and second rings 86 and 88 and are fixedly joined thereto. The struts 90 are hollow in the exemplary embodiment of the invention illustrated herein but, in other embodiments, the struts may not be hollow. Because the inter-turbine frame 60 is axially located between the HPT 24 and the LPT 26 of the high pressure rotor 33 and the low pressure inner and outer rotors 200 and 202, it is referred to as an inter-turbine frame also sometimes referred to as a mid-engine frame. An inter-turbine transition duct 114 between the HPT 24 and the LPT 26 passes through the inter-turbine frame 60.

The engine is mounted to the aircraft at a forwardly located fan frame forward mount 118 on the fan frame 34 and at an aftwardly located turbine frame aft mount 120 on the inter-turbine frame 60. The engine 10 may be mounted below an aircraft wing by a pylon at the forward mount 118 and the aft mount 120 spaced axially downstream from the forward mount 118. The aft mount 120 is used to fixedly join the inter-turbine frame 60 to a platform which is fixedly joined to the pylon. In the exemplary embodiment of the invention illustrated herein, the aft mount 120 includes a U-shaped clevis 122. Conventional mounts often use a set of circumferentially spaced apart U-shaped clevises 122 (only one of the U-shaped clevises is shown in the cross-sectional illustrations in the FIGS.) on the inter-turbine frame 60. The U-shaped clevises 122 are designed to be connected by a set of pins to a set of links. The links are connected to a platform on the bottom of the pylon. The U-shaped clevises 122 are one type of frame connecting means for connecting the engine to an aircraft. Other types of mounting means besides clevises are known in the aircraft industry and can be utilized to mount the frame of the present invention and the engine to the aircraft.

Figure 4:
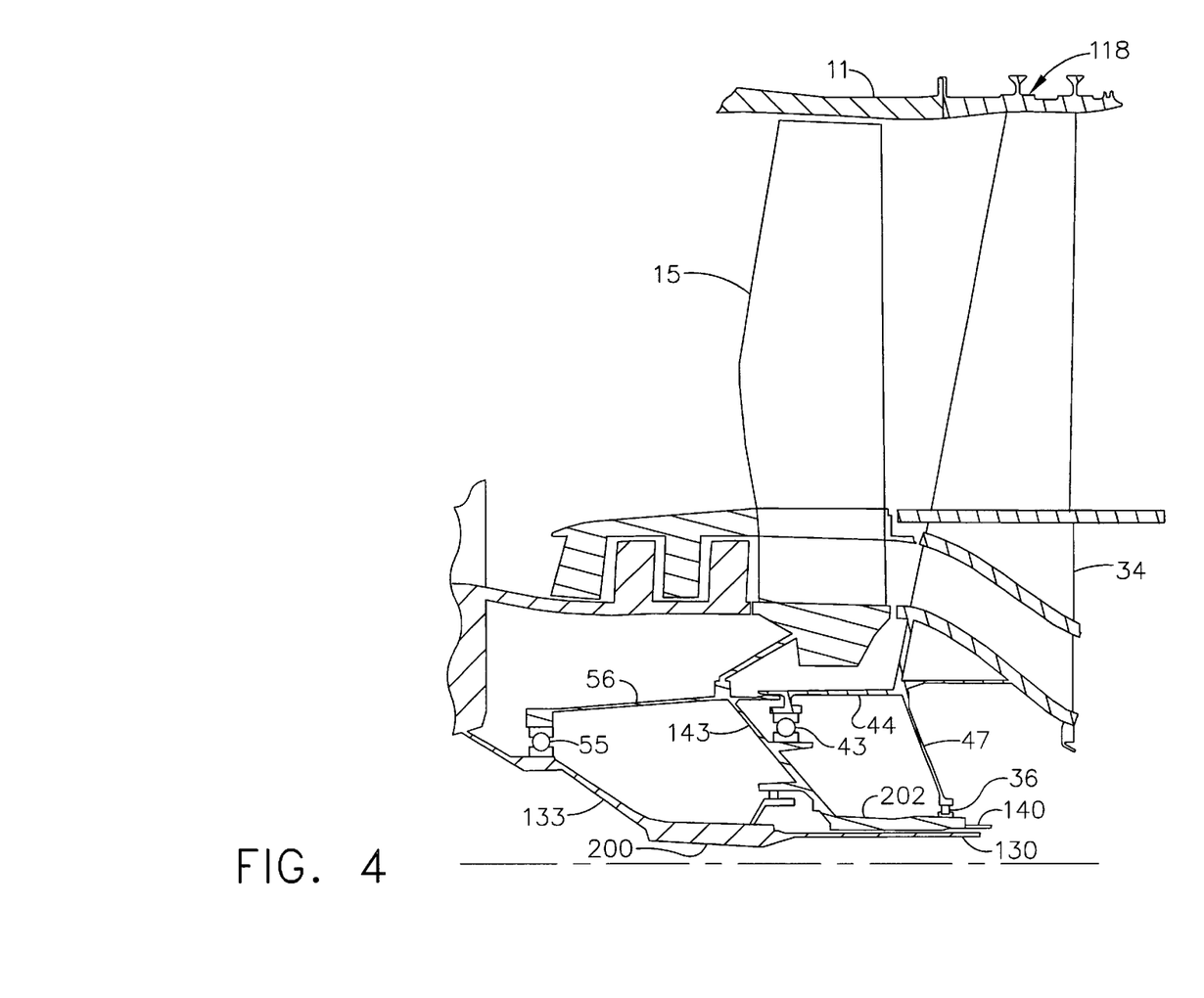
FIG. 4 is an enlarged view illustration of a fan frame and forward bearings and sump of the engine in FIG. 1.

Referring more particularly to FIG. 4, the low pressure outer rotor 202, by way of the forward conical outer shaft extension 143, is rotatably supported axially and radially from the fan frame 34 by an aft thrust bearing 43 mounted in a first bearing support structure 44 and a second bearing 36, a roller bearing, mounted in a second bearing support structure 47. The low pressure inner rotor 200, by way of the forward conical inner shaft extension 133, is rotatably supported axially and radially from the fan frame 34 by a forward differential thrust bearing 55 which is mounted between a forwardly extending extension 56 of the forward conical outer shaft extension 143 and the forward conical inner shaft extension 133. The low pressure inner rotor 200 is further rotatably supported radially from the fan frame 34 by a forward differential bearing 208, a roller bearing, between the low pressure inner shaft 130 and the low pressure outer shaft 140. The first and second bearing support structures 44 and 47 are fixedly attached to the fan frame 34.

Referring more particularly to FIG. 3, the low pressure outer rotor 202, by way of the aft low pressure outer conical shaft extension 142 connected to the low pressure outer shaft 140, is rotatably supported radially by a third bearing 76 within the inter-turbine frame 60. The third bearing 76 is disposed between an aft bearing support structure 97 attached to an aft portion 110 of the inter-turbine frame 60 and a forward inner extension 190 of the aft low pressure outer conical shaft extension 142. The low pressure outer rotor 202 is most aftwardly rotatably supported by the third bearing 76 which is thus referred to as an aftwardmost low pressure rotor support bearing. The inter-turbine frame 60 of the present invention is axially located between the HPT 24 and the LPT 26 and thus substantially supports the entire low pressure turbine 26.

The low pressure inner rotor 200, by way of the aft low pressure inner conical shaft extension 132 connected to the low pressure inner shaft 130, is rotatably supported radially by the aft low pressure outer conical shaft extension 142 of the low pressure outer rotor 202. A differential bearing 144 (also referred to as an inter-shaft bearing) is disposed between an aft inner extension 192 of the aft low pressure outer conical shaft extension 142 and an outer extension 194 of the aft low pressure inner conical shaft extension 132. This allows the low pressure inner and outer rotors 200 and 202 to counter rotate.

Referring to FIG. 1, a forward high pressure end 70 of the high pressure compressor 18 of the high pressure rotor 33 is radially rotatably supported by a bearing assembly 80 mounted in a bearing assembly support structure 82 attached to the fan frame 34. Referring more particularly to FIG. 3, an aft end 92 of the high pressure rotor 33 is aftwardly radially rotatably supported by a fifth bearing 94 mounted in a forward bearing support structure 96 attached to a forward portion 108 of the inter-turbine frame 60. The forward and aft bearing support structures 96 and 97 which are fixedly joined or attached to the forward and aft portions 108 and 110, respectively, of the inter-turbine frame 60 and thus are spaced axially apart. The forward and aft portions 108 and 110, respectively, of the inter-turbine frame 60 are separated by the second structural ring 88.

Forward and aft sump members 104 and 106 are joined to the inter-turbine frame 60 and carried by forward and aft bearing support structures 96 and 97. The forward and aft sump members 104 and 106 support the fifth bearing 94 and the third bearing 76 in forward and aft cylindrical central bores 84 and 85, respectively, of the sump members. The fifth bearing 94 and the third bearing 76 have forward and aft fixed outer races 176 and 178 that are fixedly connected to the forward and aft bearing support structures 96 and 97, respectively.

Located aft of the LPT 26 is an outlet guide vane assembly 150 which supports a stationary row of outlet guide vanes 152 that extend radially inwardly between a low pressure turbine casing 54 and an annular box structure 154. The outlet guide vane assembly 150 deswirls gas flow exiting the LPT 26. The low pressure turbine casing 54 connected is bolted to the engine casing 45 at the end of the inter-turbine transition duct 114 between the HPT 24 and the LPT 26. A dome-shaped cover plate 156 is bolted to the annular box structure 154. The outlet guide vane assembly 150 is not referred to and does not function as a frame because it does not rotatably support any of the engine's rotors.

The aft sump member 106 has a first radius R1 from the engine centerline 8 that is substantially greater than a second radius R2 of the forward sump members 104. The first radius R1 may be in a range of 150 to 250 percent larger than the second radius R2. The aft sump member 106 is located radially from the engine centerline 8 a distance that is substantially greater than the distance in similarly sized prior engines. This helps stiffen the third bearing 76 in the aft central bore 85 as does the forward and aft bearing support structures 96 and 97 being axially spaced apart and fixedly joined to forward and aft portions 108 and 110 of the inter-turbine frame 60, respectively, and separated by the second structural ring 88. These design features improve maneuver clearances by increasing stiffness of the support of the third bearing 76 and the differential bearing 144 which rotatably support the inner drum rotor 146 and the annular outer drum rotor 136, respectively, of the LPT 26.

Figure 2:
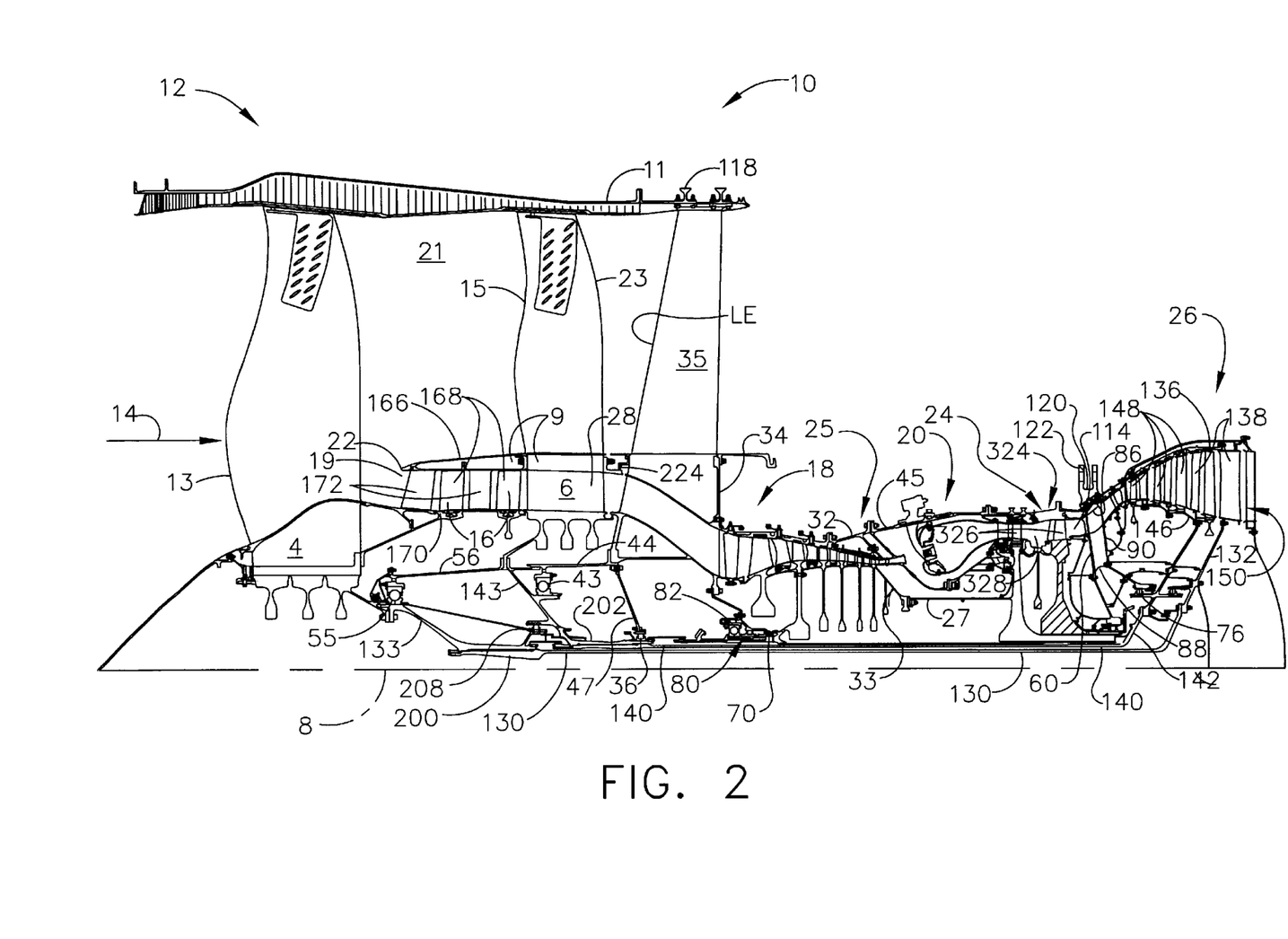
FIG. 2 is a longitudinal sectional view illustration of an alternative exemplary embodiment of an aircraft turbofan gas turbine engine with a two stage high pressure turbine and a counter rotating low pressure turbine supported by an inter-turbine frame axially located between the low pressure turbine and a high pressure turbine.

Illustrated schematically in FIG. 2 is an alternative turbofan gas turbine engine 10 configuration having a two stage high pressure turbine 324 having two stages of high pressure turbine blades 326 and a row of high pressure turbine vanes 328 as opposed to the turbofan gas turbine engine 10 illustrated in FIGS. 1 and 3 in which the HPT 24 is a single stage high pressure turbine with a single stage of HPT blades 326. This illustrates how significant engine thrust growth can be achieved with no change in fan diameter D. Thrust grow may be achieved by increasing a design fan pressure ratio across the second fan blade rows 15 stage with the same fan casing or fan diameter D as with the single stage high pressure turbine. This allows for a family of engines based on substantially the same engine architecture and basic components. The fan diameter D of all the engines 10 in the family would be substantially the same. At least two different engine models in the family would have either the one stage high pressure turbine 24 or the two stage high pressure turbine 324 of the core engine 25.

The high pressure compressor 18 of turbofan gas turbine engine 10 of the present invention is operable and designed to operate with a relatively high compressor pressure ratio in a range of about 15–30 and an overall pressure ratio in a range of about 40–65. The compressor pressure ratio is a measure in the rise of pressure across just the high pressure compressor 18. The overall pressure ratio is a measure in the rise of pressure across the fan all the way through the high pressure compressor 18, i.e., it is a ratio of pressure exiting the high pressure compressor divided by pressure of ambient air 14 entering the fan section 12. The high pressure compressor 18 is illustrated having six high pressure stages 48 and three variable vane stages 50 for the first four of the high pressure stages 48. Less than four variable vane stages 50 may be used. The high pressure compressor 18 has a relatively small number of the high pressure stages 48 and the invention contemplates using between 6–8 of the high pressure stages and about four of the variable vane stages 50 or less. This makes for a short engine while still having a high overall pressure ratio in a range of 40–65.

The engine has a design bypass ratio in a range of 5–15 and a design fan pressure ratio in a range of 1.4–2.5. The counter rotating first and second fan blade rows 13 and 15 are designed to operate with tip speeds that, for the two blade rows, sum to a range of about 1000 to 2500 ft/sec which allows the use of light weight composite fan blades. Light weight, uncooled, high temperature capability, counter rotating ceramic matrix composite (CMC) airfoils may be used in the counter rotating low pressure turbine 26. Thus the engine 10 and the fan section 12 may be described as having a sum of operational fan tip speeds of the first and second fan blade rows 13 and 15 in a range of 1000 to 2500 feet per second.

Illustrated in FIG. 1, is a tip radius RT, as measured from the engine centerline 8 to a fan blade tip 230 of the first fan blade row 13 and a hub radius RH as measured from the engine centerline 8 to a rotor hub 234 of the low pressure inner rotor 200 at an entrance 235 to the inlet duct 19 to the high pressure compressor 18 of the core engine 25. The engine 10 of the present invention may be designed with a small fan inlet hub to tip radius ratio (RH/RT) in a range between 0.20 and 0.35. For a given set of fan inlet and inlet duct annulus areas a low fan inlet hub to tip radius ratio allows a smaller fan diameter when compared to a larger ratio. However, fan inlet hub to tip radius ratio levels are constrained by the ability to design a disk to support the rotating fan blades. The fan blades in the exemplary embodiment illustrated herein are made of lightweight composite materials or aluminum and rotor fan tip speeds are designed so that a fan disk 240 can be designed for the fan inlet hub to tip radius ratio to be as low as 0.20. The low fan inlet hub to tip radius ratio allows low slopes and short lengths of the core engine transition duct 242 between the fan section 12 and the high pressure compressor 18 and of the inter-turbine transition duct 114 between the HPT 24 and the LPT 26.

Oil lubrication and scavenging of oil for the differential bearing 144 is accomplished by routing oil through supply and return orifices 220 and 222, respectively, at low stress location on the aft low pressure outer conical shaft extension 142 as illustrated in FIGS. 1, 3, and 4. This feature helps strengthen the rotors and allow the use of only two bearing support frames, the fan and inter-turbine frames, for the 3 spool design with counter rotating low pressure turbines and rotors.

Figure 5:
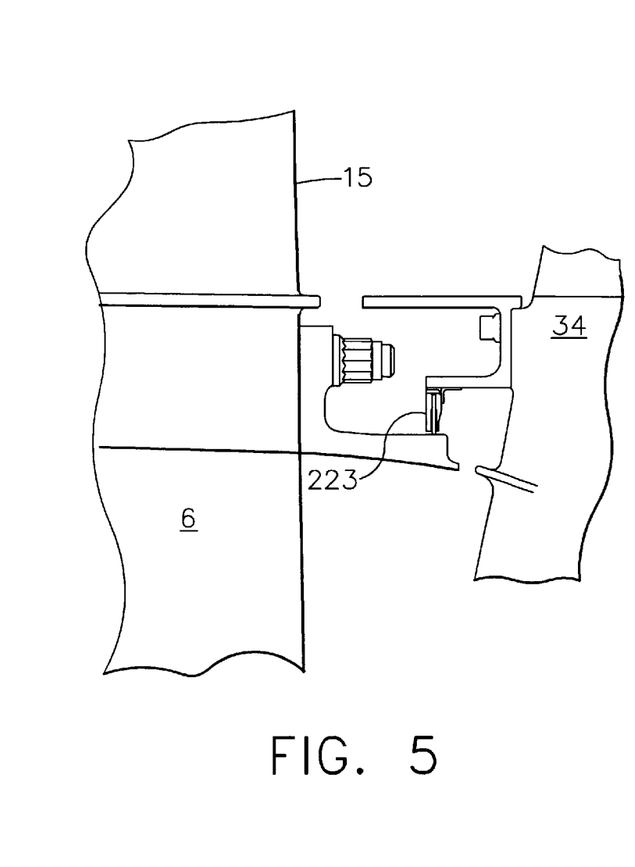
FIG. 5 is an enlarged view illustration of a radially inner forward brush seal in the counter rotating low pressure turbine in FIG. 1.
Figures 6, 7:
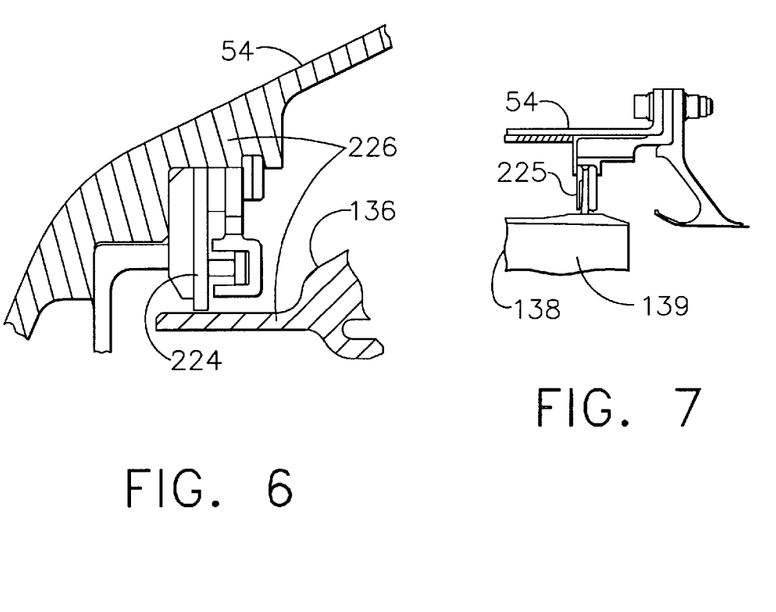
FIG. 6 is an enlarged view illustration of a radially outer forward brush seal in the counter rotating low pressure turbine in FIG. 1.
FIG. 7 is an enlarged view illustration of an aft brush seal in the counter rotating low pressure turbine in FIG. 1.
Figure 8:
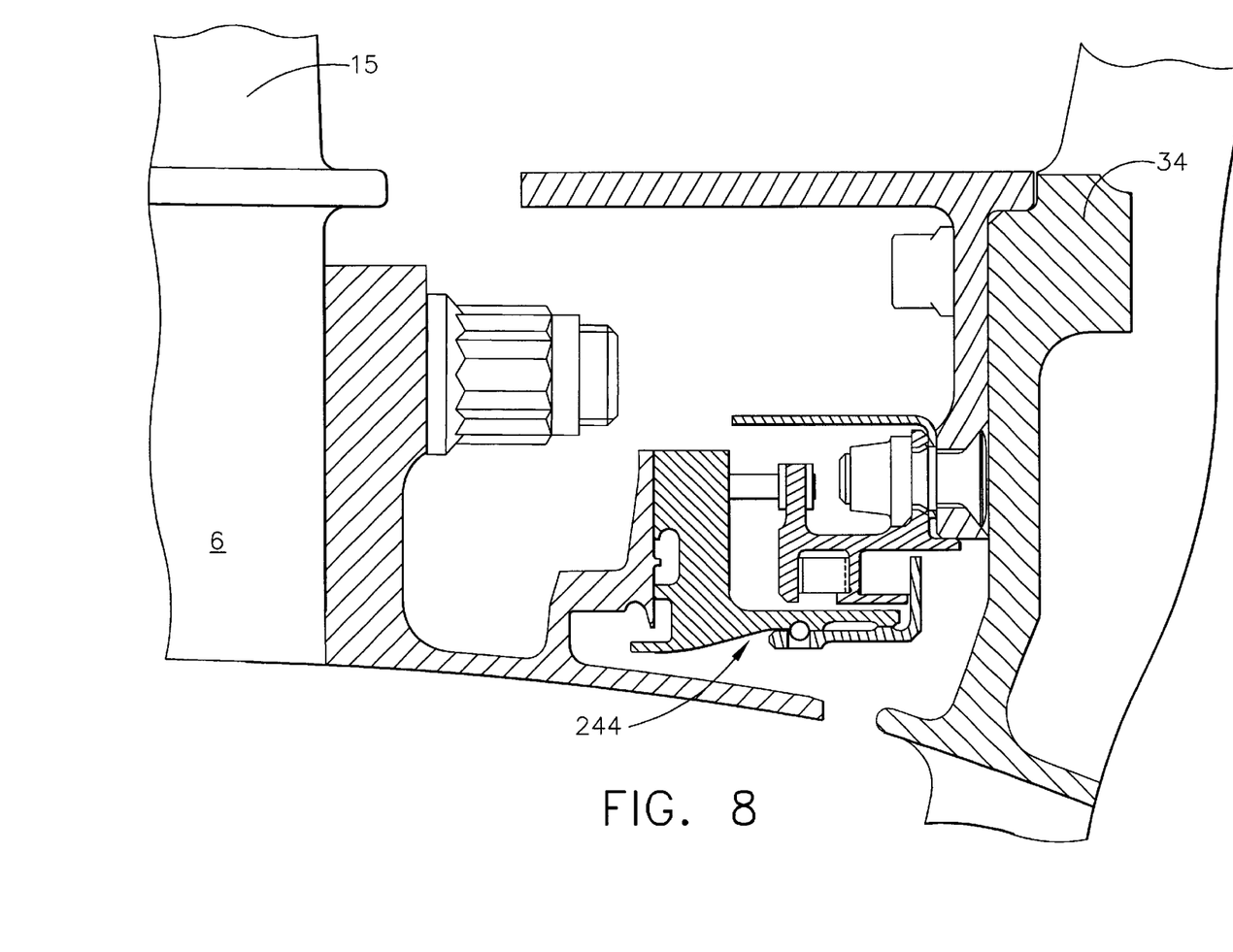
FIG. 8 is an enlarged view illustration of a radially inner forward non contacting seal in the counter rotating low pressure turbine in FIG. 1.
Figure 9:
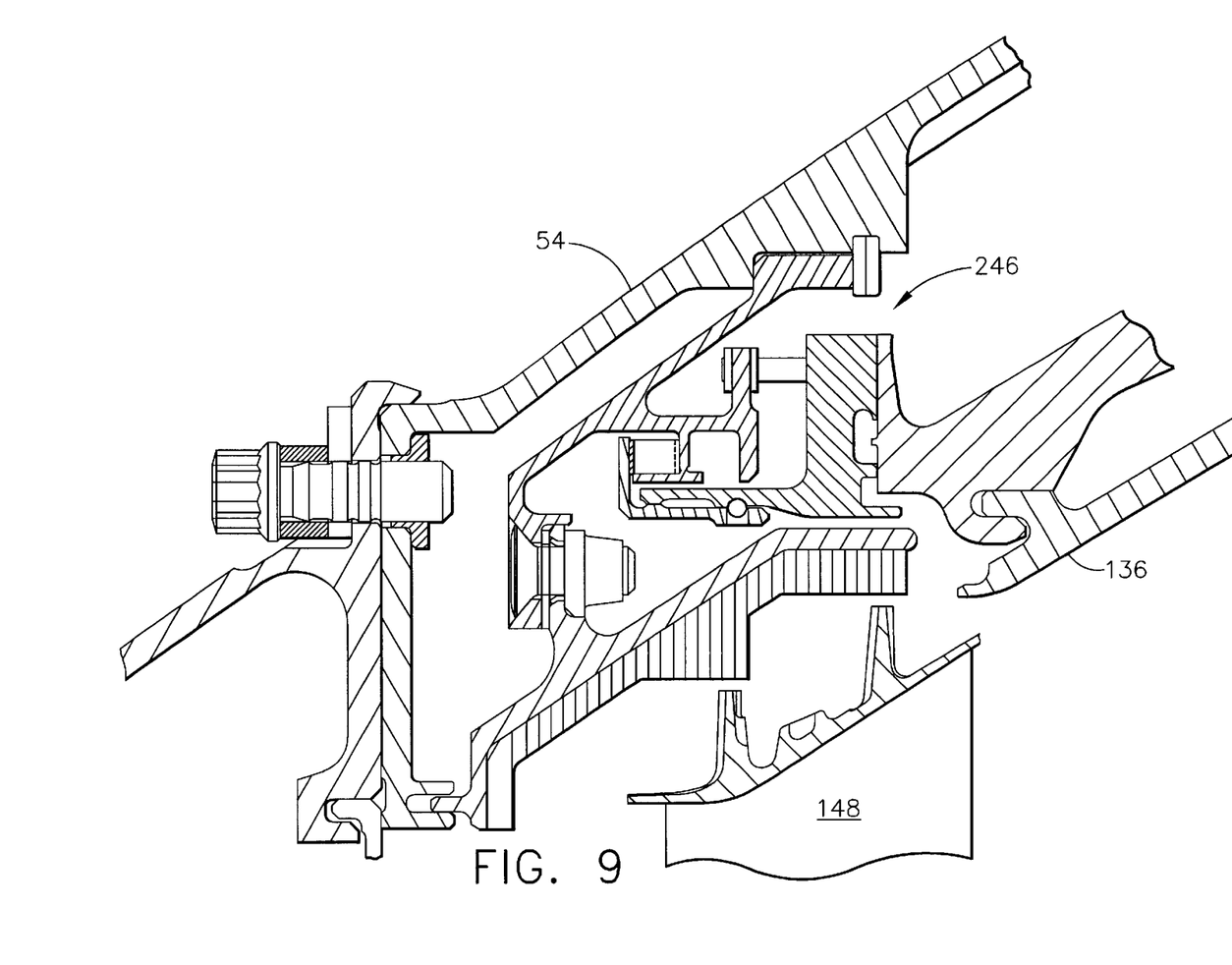
FIG. 9 is an enlarged view illustration of a radially outer forward non contacting seal in the counter rotating low pressure turbine in FIG. 1.
Figure 10:
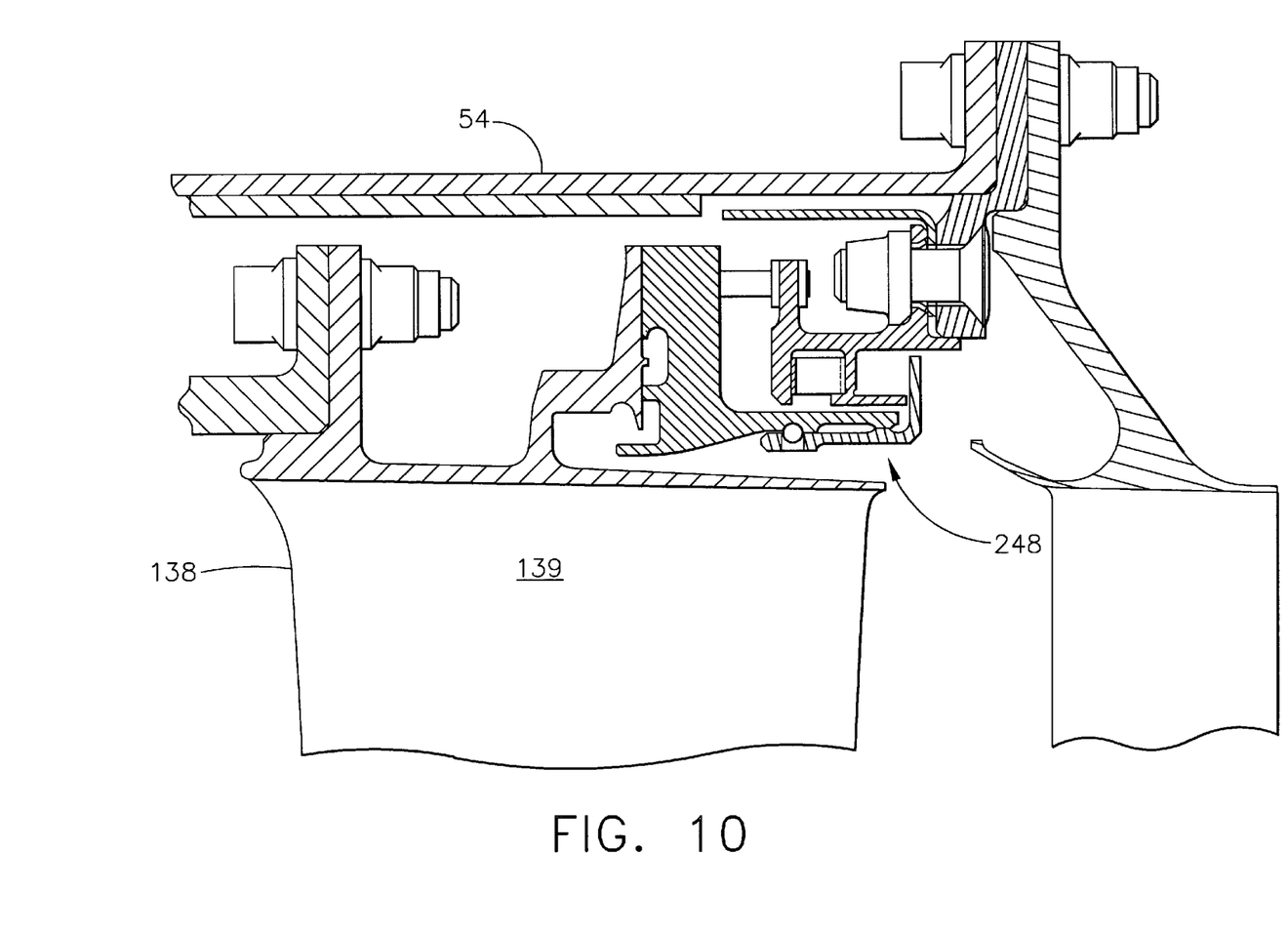
FIG. 10 is an enlarged view illustration of an aft non contacting seal in the counter rotating low pressure turbine in FIG. 1.

Sealing of the counter rotating low pressure rotors to booster and LPT cases is enhanced by the use of brush seals or other high efficiency seals. Illustrated in FIG. 5 is a first brush seal 223 disposed in sealing arrangement between the second fan 6 and the fan frame 34. Illustrated in FIG. 6 is a second brush seal 224 disposed in sealing arrangement between forward ends 226 of the low pressure turbine casing 54 and the outer drum rotor 136. Illustrated in FIG. 7 is a third brush seal 225 disposed in sealing arrangement between an aft end 228 of the low pressure turbine casing 54 and the final stage 139 of the low pressure turbine blade rows 138 which is bolted to the outer drum rotor 136. An alternative to the brush seals are non contacting seals such as aspirating seals or face seals in some or all of the above locations. Illustrated in FIG. 8 is a first non contacting seal 244 disposed in sealing arrangement between the second fan 6 and the fan frame 34. Illustrated in FIG. 9 is a second non contacting seal 246 disposed in sealing arrangement between forward ends 226 of the low pressure turbine casing 54 and the outer drum rotor 136. Illustrated in FIG. 10 is a third non contacting seal 248 disposed in sealing arrangement between an aft end 228 of the low pressure turbine casing 54 and the final stage 139 of the low pressure turbine blade rows 138 which is bolted to the outer drum rotor 136. In other embodiments the seals may be a combination of brush seals and non contacting seals.

The present invention has been described in an illustrative manner. It is to be understood that the terminology which has been used is intended to be in the nature of words of description rather than of limitation. While there have been described herein, what are considered to be preferred and exemplary embodiments of the present invention, other modifications of the invention shall be apparent to those skilled in the art from the teachings herein and, it is, therefore, desired to be secured in the appended claims all such modifications as fall within the true spirit and scope of the invention.

Accordingly, what is desired to be secured by Letters Patent of the United States is the invention as defined and differentiated in the following claims:

What is claimed is:

1. An aircraft gas turbine engine comprising:

a high pressure rotor including a high pressure turbine, a low pressure turbine having counter rotatable low pressure inner and outer rotors located aft of said high pressure rotor, said low pressure inner and outer rotors including low pressure inner and outer shafts which are at least in part rotatably disposed co-axially with and radially inwardly of said high pressure rotor, said low pressure turbine including a rotatable annular outer drum rotor drivingly connected to a first fan blade row and a first booster by said low pressure inner shaft, said low pressure turbine further including a rotatable annular inner drum rotor drivingly connected to a second fan blade row and a second booster by said low pressure outer shaft, said first and second boosters axially located between said first and second fan blade rows, a bypass duct radially bounded by a fan casing and an annular radially inner bypass duct wall surrounding said first and second boosters, a radially outer portion of said second fan blade row is radially disposed within said bypass duct, a fan inlet hub to tip radius ratio in a range between 0.20 and 0.35, a high pressure compressor of said high pressure rotor drivenly connected to said high pressure turbine by a high pressure shaft, said high pressure compressor being operable to produce an overall pressure ratio in a range of about 40–65, a bypass ratio in a range of 5–15, an operational fan pressure ratio in a range of 1.4–2.5, and a sum of operational fan tip speeds of said first and second fan blade rows in a range of 1000 to 2500 feet per second, and said second booster being counter rotatable with respect to said high pressure compressor.

2. An aircraft gas turbine engine comprising:

a high pressure rotor including a high pressure turbine, a low pressure turbine having counter rotatable low pressure inner and outer rotors located aft of said high pressure rotor, said low pressure inner and outer rotors including low pressure inner and outer shafts which are at least in part rotatably disposed co-axially with and radially inwardly of said high pressure rotor, said low pressure turbine including a rotatable annular outer drum rotor drivingly connected to a first fan blade row and a first booster by said low pressure inner shaft, said low pressure turbine further including a rotatable annular inner drum rotor drivingly connected to a second fan blade row and a second booster by said low pressure outer shaft, said first and second boosters axially located between said first and second fan blade rows, a bypass duct radially bounded by a fan casing and an annular radially inner bypass duct wall surrounding said first and second boosters, a radially outer portion of said second fan blade row is radially disposed within said bypass duct, a fan inlet hub to tip radius ratio in a range between 0.20 and 0.35, a high pressure compressor of said high pressure rotor drivenly connected to said high pressure turbine by a high pressure shaft, said second booster being counter rotatable with respect to said high pressure compressor, said high pressure compressor being operable to produce an overall pressure ratio in a range of about 40–65, a bypass ratio in a range of 5–15, an operational fan pressure ratio in a range of 1.4–2.5, and a sum of operational fan tip speeds of said first and second fan blade rows in a range of 1000 to 2500 feet per second, and said high pressure compressor including between six and eight high pressure stages.

3. An engine as claimed in claim 2 wherein said high pressure compressor includes about four or less variable vane stages.

4. An engine as claimed in claim 3 wherein said first booster includes an integrally bladed annular first booster rotor section including a rotatable wall section from which axially spaced apart first booster blade rows extend radially inwardly.

5. An aircraft gas turbine engine comprising:

a high pressure rotor including a high pressure turbine, a low pressure turbine having counter rotatable low pressure inner and outer rotors located aft of said high pressure rotor, said low pressure inner and outer rotors including low pressure inner and outer shafts which are at least in part rotatably disposed co-axially with and radially inwardly of said high pressure rotor, an outlet guide vane assembly located directly aft of said low pressure turbine, said low pressure turbine including a rotatable annular outer drum rotor drivingly connected to a first fan blade row and a first booster by said low pressure inner shaft, said low pressure turbine further including a rotatable annular inner drum rotor drivingly connected to a second fan blade row and a second booster by said low pressure outer shaft, said first and second boosters axially located between said first and second fan blade rows, a bypass duct radially bounded by a fan casing and an annular radially inner bypass duct wall surrounding said first and second boosters, a radially outer portion of said second fan blade row is radially disposed within said bypass duct, a fan inlet hub to tip radius ratio in a range between 0.20 and 0.35, a high pressure compressor of said high pressure rotor drivenly connected to said high pressure turbine by a high pressure shaft, said high pressure compressor being operable to produce an overall pressure ratio in a range of about 40–65, a bypass ratio in a range of 5–15, an operational fan pressure ratio in a range of 1.4–2.5, and a sum of operational fan tip speeds of said first and second fan blade rows in a range of 1000 to 2500 feet per second, and said second booster being counter rotatable with respect to said high pressure compressor.

6. An engine as claimed in claim 5 wherein said high pressure compressor includes between six and eight high pressure stages.

7. An engine as claimed in claim 6 wherein said high pressure compressor includes about four or less variable vane stages.

8. An engine as claimed in claim 7 wherein said first booster includes an integrally bladed annular first booster rotor section including a rotatable wall section from which axially spaced apart first booster blade rows extend radially inwardly.

9. An engine as claimed in claim 8 wherein said outlet guide vane assembly further includes a row of outlet guide vanes that extend radially inwardly between a low pressure turbine casing, surrounding said low pressure turbine, and an annular box structure.

10. An aircraft gas turbine engine family comprising:
at least two different engine models having substantially the same fan diameter,
a first one of the engine models having a one stage high pressure turbine,
a second one of the engine models having a two stage high pressure turbine,
each of said models having;
a high pressure rotor including one of said one and two stage high pressure turbines,
a low pressure turbine having counter rotatable low pressure inner and outer rotors located aft of said high pressure rotor,
said low pressure inner and outer rotors including low pressure inner and outer shafts which are at least in part rotatably disposed co-axially with and radially inwardly of said high pressure rotor,
said low pressure turbine including a rotatable annular outer drum rotor drivingly connected to a first fan blade row and a first booster by said low pressure inner shaft,
said low pressure turbine further including a rotatable annular inner drum rotor drivingly connected to a second fan blade row and a second booster by said low pressure outer shaft,
said first and second boosters axially located between said first and second fan blade rows,
a bypass duct radially bounded by a fan casing and an annular radially inner bypass duct wall surrounding said first and second boosters,
a radially outer portion of said second fan blade row is radially disposed within said bypass duct,
a fan inlet hub to tip radius ratio in a range between 0.20 and 0.35,
a high pressure compressor of said high pressure rotor drivenly connected to said high pressure turbine by a high pressure shaft,
said high pressure compressor being operable to produce an overall pressure ratio in a range of about 40–65, and
a bypass ratio in a range of 5–15, an operational fan pressure ratio in a range of 1.4–2.5, and a sum of operational fan tip speeds of said first and second fan blade rows in a range of 1000 to 2500 feet per second.

11. An aircraft gas turbine engine family as claimed in claim 10 wherein said second booster is counter rotatable with respect to said high pressure compressor.

12. An aircraft gas turbine engine family as claimed in claim 11 wherein said high pressure compressor includes between six and eight high pressure stages.

13. An aircraft gas turbine engine family as claimed in claim 12 wherein said high pressure compressor includes about four or less variable vane stages.

14. An aircraft gas turbine engine family as claimed in claim 13 wherein said first booster includes an integrally bladed annular first booster rotor section including a rotatable wall section from which axially spaced apart first booster blade rows extend radially inwardly.

15. An aircraft gas turbine engine family as claimed in claim 14 wherein an outlet guide vane assembly is located directly aft of said low pressure turbine.

16. An aircraft gas turbine engine family as claimed in claim 15 wherein said high pressure compressor includes between six and eight high pressure stages.

17. An aircraft gas turbine engine family as claimed in claim 16 wherein said high pressure compressor includes about four or less variable vane stages.

18. An aircraft gas turbine engine family as claimed in claim 14 wherein said first booster includes an integrally bladed annular first booster rotor section including a rotatable wall section from which axially spaced apart first booster blade rows extend radially inwardly.

19. An aircraft gas turbine engine family as claimed in claim 18 wherein said outlet guide vane assembly further includes a row of outlet guide vanes that extend radially inwardly between a low pressure turbine casing, surrounding said low pressure turbine, and an annular box structure.

* * * * *